United States Patent Office 2,701,327
Patented Feb. 1, 1955

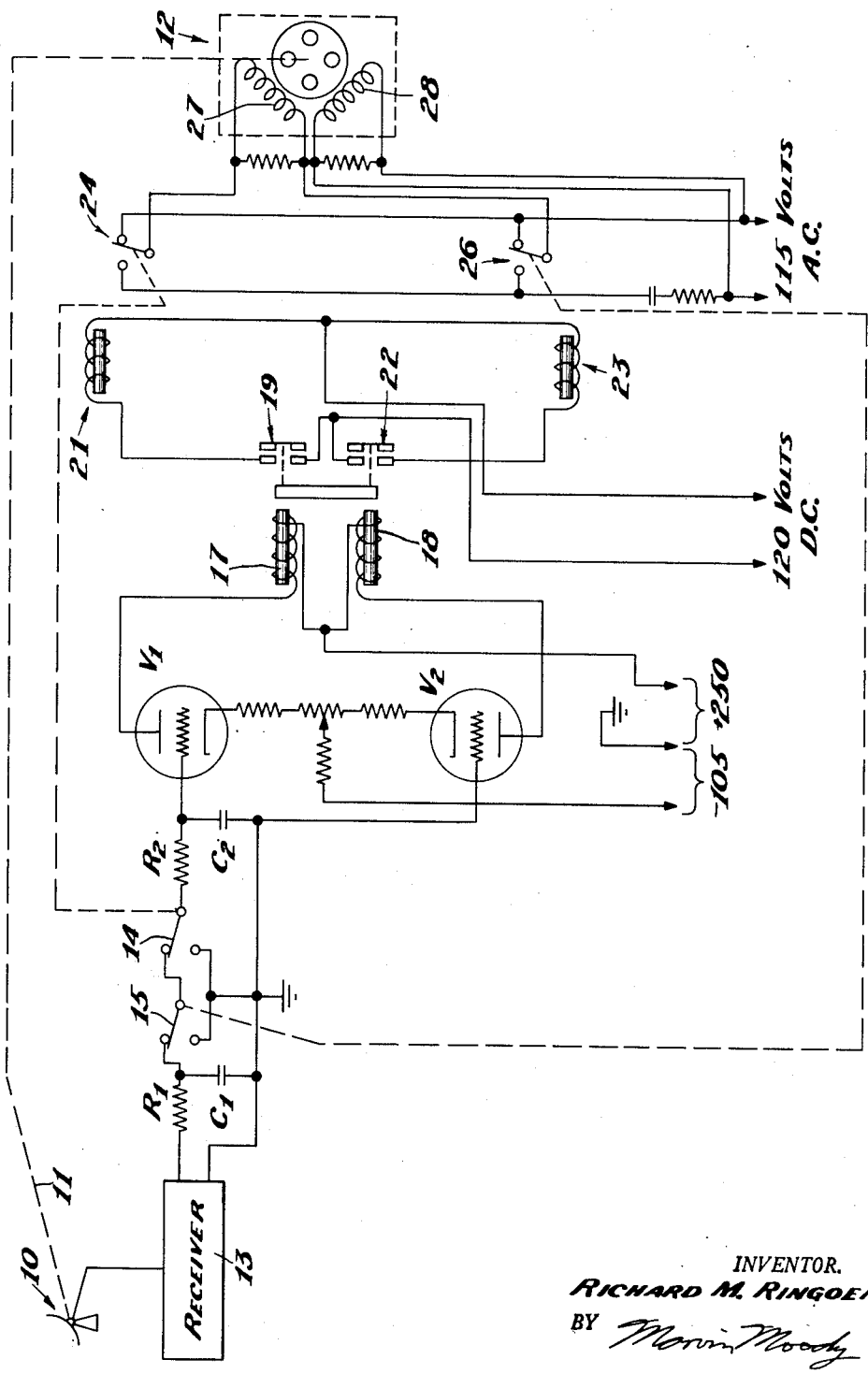

2,701,327

SPECIAL RELAY CONTROL OF SERVOMOTORS

Richard M. Ringoen, Cedar Rapids, Iowa, assignor to Collins Radio Company, Cedar Rapids, Iowa, a corporation of Iowa Application March 24, 1952, Serial No. 278,287

4 Claims. (Cl. 318—16)

This invention relates in general to a motor control circuit and in particular to a circuit for tracking a variable rate signal in an incremental fashion.

It is oftentimes desirable in servo mechanisms to track a target whose angular position varies at a rapid rate at one instance and at a much slower rate at a later time. It has been difficult to design a control circuit which will satisfactorily meet both of these requirements because the one designed for rapid tracking is generally not sensitive enough for slow tracking.

For example, it is desired to keep a radio sextant trained on the target at all times. Generally the targets move at a relatively slow rate, as for example the sun, but at times it is necessary to change targets at a rapid rate.

It is an object of this invention, therefore, to provide a motor control circuit which is operable over a broad speed range.

A feature of this invention is found in the provision for an RC circuit which receives an input signal and actuates one of a pair of relays to control the phase voltages supplied to an induction motor.

Further objects, features, and advantages of this invention will become apparent from the following description and claims when read in view of the drawing in which the figure illustrates a motor control circuit according to this invention.

The figure shows by way of example a radio sextant 10 which may be driven about one of its axes by a shaft 11 connected to a suitable driving means 12. A receiver 13 receives an input from the sextant 10 proportional to the error of the sextant.

The output of the receiver is supplied to a filter circuit comprising $R_1$ and $C_1$ which smooths out the rapid fluctuations of the error signal and furnishes it through switches 14 and 15 to a second RC circuit comprising $R_2$ and $C_2$.

A pair of tubes $V_1$ and $V_2$ are connected in a balanced circuit and to $R_2$ and $C_2$. A first relay 17 is connected in the plate circuit of tube $V_1$ and a second relay 18 is connected in the plate circuit of tube $V_2$.

The relay 17 closes contacts 19 when energized which connects a relay 21 to a power supply so as to energize its field coil. The relay 18 controls contacts 22 which connect a relay 23 to a voltage supply so as to energize it. The relay 21 controls switches 14 and 24 and the relay 23 controls switches 26 and 15.

The switch 24 is connected to one end of one winding 27 of the two-phase induction motor 12 and switch 26 is connected to the opposite end of the winding 27. The other winding 28 of the induction motor is energized at all times by a suitable alternating current voltage.

If relay 21 is energized the motor 12 will rotate in one direction, whereas if relay 23 is energized the motor will rotate in the opposite direction.

The relays 21 and 23, respectively, also control switches 14 and 15 so that when either one of the relays is energized, the condenser $C_2$ will be discharged.

Suitable voltages are connected to the circuit, as for example, minus 105 volts between the midpoint between the cathodes of tubes $V_1$ and $V_2$ and ground, plus 250 volts between ground and the relays 17 and 18, 120 volts D. C. between the relays 21 and 23, and 115 volts A. C. across the windings of the induction motor.

In operation, a varying direct current signal from the receiver 13 is integrated by the network comprising $R_1$, $C_1$, $R_2$, and $C_2$, and is supplied to the grid of tubes $V_1$ and $V_2$. When this signal reaches a high enough positive value, the relay 17 will be energized, thus causing the relay 21 to be energized.

When the relay 21 is energized, power is supplied to both phases of the induction motor and the motor will run. The relay 21 at the same time closes switch 14, thus allowing the condenser $C_2$ to discharge to ground. The time of discharge of condenser $C_2$ determines the time that the relay 21 will open. When the voltage reaches a pre-set value the relays 17 and 21 will open.

If the error signal goes the other way in polarity, relays 18 and 23 will be energized and motor 12 will run in the opposite direction. Thus, the sextant 10 will track.

When it is desired to slew rapidly, the motor 12 may be operated at maximum speed until the new position is reached.

The number of revolutions the motor runs is determined primarily by the discharge time constant of condenser $C_2$ through resistor $R_2$. The circuit of this invention might be used, for example, as a tracking servo amplifier in a radiometric sextant. The target velocities in such cases are very low and signal fluctuations are of great concern. The relay control of this invention operates very well at low speeds encountered in tracking the sun, for example. This is because the motor is allowed to rest most of the time and runs only when the error voltage exceeds a given value, this value being the voltage required to energize either of the relays 17 or 18. Each time one of the relays 17 or 18 is energized, the motor 12 will rotate a given number of revolutions. This is determined by the discharge time of the condenser $C_2$ through the resistor $R_2$. When it is discharged to a sufficiently low level, the particular relay 17 or 18 which is energized, will be de-energized and thus allow one of the relays 21 or 23 to be de-energized. This connects switch 14 or 15 back to the charging circuit from the receiver. Thus, intermittent rotation will occur and in a direction determined by the polarity of the output of the receiver 13. If the error signal has grown to a sufficiently high level while switch 14 or 15 was disconnected, the cycle will be immediately repeated. Otherwise, the motor will remain at rest until the error signal becomes great enough to trigger one of the relays. Thus, a wide average speed range is provided by the system of this invention.

Although this invention has been described with respect to a particular embodiment thereof, it is not to be so limited as changes and modifications may be made therein which are within the full intended scope of the invention as defined by the appended claims.

I claim:

1. A control circuit for tracking a moving body in an incremental fashion comprising, a driving means, a receiving means receiving a signal from the body and producing an output proportional to the tracking error, said receiving means connected to the output shaft of the driving means, a first switching means connected to the output of the receiving means, an RC circuit connected to the first switching means, a balanced circuit comprising a pair of electron tubes connected to said RC circuit, a first relay connected to the plate of one of said electron tubes, a second relay connected to the plate of the other electron tube, power reversing means controlled by said relays, said driving means connected to said power reversing means, and said first switching means actuated by said power reversing means.

2. Apparatus for reducing an error signal comprising, a receiving means producing an output proportional to an error, a driving means connected to said receiving means, a first switching means connected to the output of said receiving means, an RC circuit comprising a resistor and condenser connected to said first switching means, a balanced circuit comprising a pair of electron tubes with the grid of one of said electron tubes connected to said rate circuit, a pair of relays connected in the plate circuits between said first and second tubes, a power reversing circuit controlled by said relays, said power reversing circuit connected to said driving means to reverse its direction of rotation, and said power reversing means connected to said first switching means to discharge the condenser of said RC circuit when the driving means is energized.

3. Means for driving an error signal to zero comprising, an error signal producing means, an RC circuit comprising a resistor and condenser, a first switching means connecting said error signal producing means to said RC circuit, a pair of balanced electron tubes connected to said rate circuit, a pair of relays connected in the plate circuits of said tubes, a two-phase induction motor connected to said error signal producing means, an alternating current power supply connected at all times to one phase of said motor, a pair of switches connected at opposite ends of the other phase of said motor, said relays connected to said pair of switches to operate them to control the direction of rotation of the driving means, and the pair of switches connected to the first switching means to discharge the condenser when the motor is energized.

4. A differential control circuit comprising, an error signal generator, a driving means connected to said error signal generator to drive the error to zero, a switching means connected to the output of said error signal generator, an RC circuit comprising a resistor and condenser connected to the switching means, a balanced electron tube circuit connected to the RC circuit, a pair of relays connected between the plates of said tubes, a two-phase electric induction motor with one phase connected to a voltage source at all times, a power reversing circuit connected to the other phase of said two-phase induction motor, said pair of relays controlling said power reversing circuit, and said power reversing circuit connected to said first switching means to discharge the condenser when energized.

References Cited in the file of this patent

UNITED STATES PATENTS

| | | |
|---|---|---|
| 2,454,107 | Wald | Nov. 16, 1948 |
| 2,468,179 | Darlington et al. | Apr. 26, 1949 |
| 2,484,134 | Wald | Oct. 11, 1949 |
| 2,511,564 | Callan | June 13, 1950 |
| 2,519,667 | Koenig, Jr. | Aug. 22, 1950 |
| 2,590,528 | Gilbert | Mar. 25, 1952 |
| 2,651,022 | Shelley | Sept. 1, 1953 |